(12) United States Patent
Urahama

(10) Patent No.: US 11,657,838 B2
(45) Date of Patent: May 23, 2023

(54) CLEANING ENABLING DEVICE, CLEANING DEVICE, AND MAGNETIC TAPE DEVICE

(71) Applicant: NEC Platforms, Ltd., Kawasaki (JP)

(72) Inventor: Hidehiro Urahama, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/430,067

(22) PCT Filed: Feb. 10, 2020

(86) PCT No.: PCT/JP2020/005022
§ 371 (c)(1),
(2) Date: Aug. 11, 2021

(87) PCT Pub. No.: WO2020/166540
PCT Pub. Date: Aug. 20, 2020

(65) Prior Publication Data
US 2022/0051692 A1    Feb. 17, 2022

(30) Foreign Application Priority Data

Feb. 15, 2019    (JP) ............................. JP2019-025180

(51) Int. Cl.
*G11B 5/41*          (2006.01)
*G11B 15/67*         (2006.01)
(Continued)

(52) U.S. Cl.
CPC ................ *G11B 5/41* (2013.01); *B08B 1/04* (2013.01); *G11B 15/67* (2013.01); *B08B 1/002* (2013.01)

(58) Field of Classification Search
None
See application file for complete search history.

(56) References Cited

U.S. PATENT DOCUMENTS

| 5,453,894 A * | 9/1995 | Kim ......................... G11B 5/41 360/128 |
| 5,835,317 A | 11/1998 | Kawakami et al. |

(Continued)

FOREIGN PATENT DOCUMENTS

| JP | H09-115115 A | 5/1997 |
| JP | H09-212832 A | 8/1997 |

(Continued)

OTHER PUBLICATIONS

International Search Report for PCT Application No. PCT/JP2020/005022, dated Apr. 21, 2020.
(Continued)

*Primary Examiner* — Craig A. Renner

(57) ABSTRACT

In order to reduce the possibility of occurrence of retraction of a cleaning member during cleaning of a magnetic head and the possibility of the cleaning member not being able to return to a retraction position due to stopping part way, the cleaning enabling device is provided with: a holding member having a first surface capable of holding the cleaning member for cleaning the magnetic head, and a second surface capable of lifting a magnetic tape from the magnetic head; a transmission part which transmits a first driving force for driving a first driving member; and a first force application part which applies, to the holding member, a first force in a direction that causes the cleaning member to remain in the retraction position when the cleaning member is in the retraction position and releases the first force when the cleaning member is drawn away from the retraction position.

18 Claims, 10 Drawing Sheets

(51) Int. Cl.
 *B08B 1/04* (2006.01)
 *B08B 1/00* (2006.01)

(56) References Cited

U.S. PATENT DOCUMENTS

| | | | | |
|---|---|---|---|---|
| 5,862,116 | A * | 1/1999 | Watanabe | G11B 17/056 360/99.06 |
| 6,067,211 | A * | 5/2000 | Chliwnyj | G11B 15/62 |
| 6,067,212 | A * | 5/2000 | Poorman | G11B 15/67 |
| 6,166,881 | A * | 12/2000 | Anderson | G11B 5/41 |
| 6,208,488 | B1 * | 3/2001 | Yamakawa | G11B 15/67 |
| 6,359,751 | B1 * | 3/2002 | Groel | G11B 5/41 |
| 6,621,656 | B2 * | 9/2003 | Underkofler | G11B 15/67 360/95 |
| 6,697,212 | B2 * | 2/2004 | Tsuchiya | G11B 15/672 360/95 |
| 6,751,056 | B1 | 6/2004 | Anderson et al. | |
| 6,945,488 | B2 * | 9/2005 | Shimanuki | G11B 15/67 360/95 |
| 8,270,113 | B2 * | 9/2012 | Ojima | G11B 5/41 360/128 |
| 8,284,519 | B2 * | 10/2012 | Sato | G11B 5/41 360/128 |
| 8,917,476 | B2 * | 12/2014 | Holmberg | G11B 5/584 360/90 |
| 11,011,194 | B2 * | 5/2021 | Urahama | G11B 15/43 |
| 2002/0048118 | A1 * | 4/2002 | Tanaka | G11B 15/67 |
| 2002/0181145 | A1 * | 12/2002 | Tsuchiya | G11B 15/672 360/95 |
| 2003/0075633 | A1 * | 4/2003 | Shimanuki | G11B 15/67 242/332.4 |
| 2004/0042120 | A1 * | 3/2004 | Davis | G11B 15/67 |
| 2006/0256474 | A1 | 11/2006 | Tanaka | |
| 2009/0027806 | A1 * | 1/2009 | Biskeborn | G11B 5/41 360/128 |
| 2010/0232063 | A1 | 9/2010 | Sato | |
| 2012/0081814 | A1 * | 4/2012 | Ojima | G11B 5/41 360/130.31 |
| 2013/0301159 | A1 * | 11/2013 | Mori | G11B 23/049 360/96.1 |
| 2015/0043105 | A1 * | 2/2015 | Ashikawa | G11B 19/26 15/256.5 |
| 2017/0178679 | A1 * | 6/2017 | Ojima | G11B 15/43 |

FOREIGN PATENT DOCUMENTS

| | | |
|---|---|---|
| JP | H11-296827 A | 10/1999 |
| JP | 2006-318563 A | 11/2006 |
| JP | 2012-216256 A | 11/2006 |
| JP | 2014-207048 A | 10/2014 |
| JP | 2015-011749 A | 1/2015 |
| WO | 96/036962 A1 | 11/1996 |
| WO | 2013/168621 A1 | 11/2013 |

OTHER PUBLICATIONS

English translation of Written opinion for PCT Application No. PCT/JP2020/005022, dated Apr. 21, 2020.
Japanese Office Action for JP Application No. 2019-025180 dated Aug. 6, 2019 with English Translation.
Japanese Office Action for JP Application No. 2019-025180 dated Oct. 15, 2019 with English Translation.

* cited by examiner

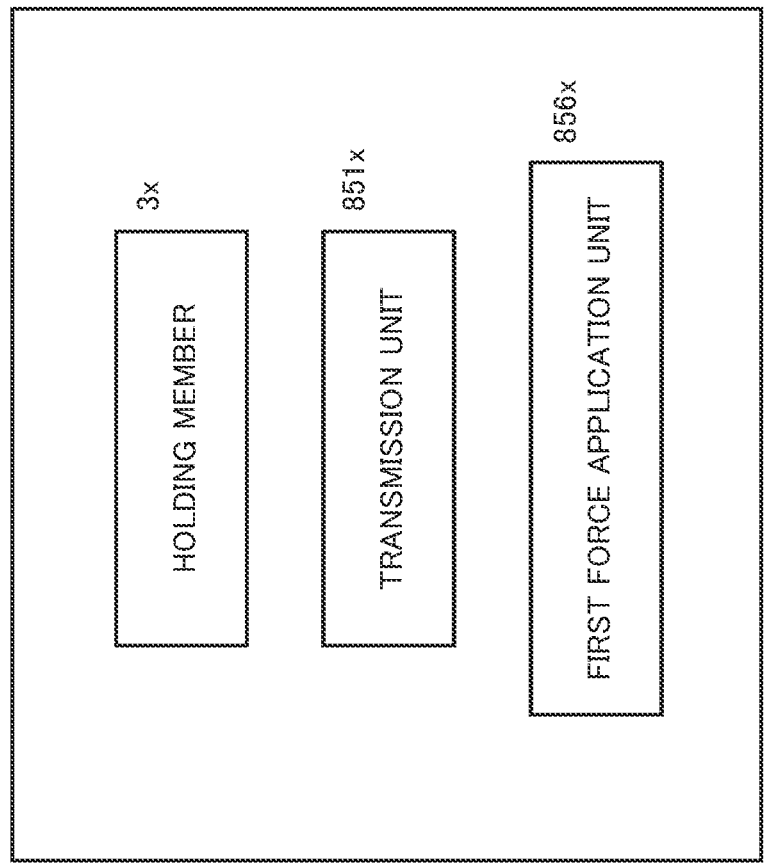

CLEANING ENABLING DEVICE, CLEANING DEVICE, AND MAGNETIC TAPE DEVICE

This application is a National Stage Entry of PCT/JP2020/005022 filed on Feb. 10, 2020, which claims priority from Japanese Patent Application 2019-025180 filed on Feb. 15, 2019, the contents of all of which are incorporated herein by reference, in their entirety.

TECHNICAL FIELD

The present invention relates to cleaning of a magnetic head.

BACKGROUND ART

A magnetic tape device causes a magnetic tape to travel on a magnetic head at a time of data recording and reproduction. At this occasion, the magnetic head and the magnetic tape are worn, and abrasion powder remains on a surface of the magnetic tape. The abrasion powder deteriorates data recording and reproduction performance of the magnetic head. The performance deterioration is recoverable by cleaning of the magnetic head with a brush and the like. Generally, it is often the case that cleaning of a magnetic head is performed when performance deterioration of the magnetic head is detected during data reading and writing. However, in a case where cleaning is performed in a state that a magnetic tape is accommodated (unthreaded) in a cartridge, cleaning of a magnetic head is required to be performed by interrupting data recording and reproduction for a long time at a time of detecting performance deterioration of the magnetic head during data reading and writing. In view of the above, it is desirable that cleaning of the magnetic head can be performed also in a threading state in which the magnetic tape is drawn out of the cartridge.

PTL 1 discloses an example of a technique for cleaning a magnetic head in a threading state. In the method of PTL 1, a magnetic tape separation mechanism moves a recording magnetic tape away from a magnetic head in a thickness direction, and a cleaning device cleans the magnetic head in a state that the magnetic tape is moved away from the magnetic head.

CITATION LIST

Patent Literature

[PTL 1] Japanese Unexamined Patent Application Publication No. 2012-216256

SUMMARY OF INVENTION

Technical Problem

In an information recording system of PTL 1, a mechanism for moving a magnetic tape away from a magnetic head, and a mechanism for moving a cleaning member of the magnetic head to a cleaning position are independent of each other. Therefore, the information recording system of PTL 1 has a problem that a mechanism for enabling cleaning of the magnetic head is complicated. The complicated mechanism results in an increase in production cost and an increase in size of a device in a magnetic tape device.

As a method capable of solving this problem, a method is conceived in which a magnetic tape is moved away from a magnetic head by a surface of a holder for installing a cleaning member, the surface being a surface on which the cleaning member is not installed, and cleaning of the magnetic head is performed by the cleaning member. In the above-described method, a structure is conceived in which retraction of a holder is performed by a restoring force of a spring. In this case, the holder may not return to a retraction position, and stop on a way in a case where sliding performance is deteriorated due to repeated use, and the like. In this case, an unintended retracting operation of the holder may occur by a spring force. When the unintended retracting operation occurs during cleaning of the magnetic head, cleaning is not properly performed.

An object of the present invention is to provide a cleaning enabling device and the like which enable reducing a possibility that retraction of a cleaning member occurs, and a possibility that the cleaning member fails to return to a retraction position and stops on a way, during cleaning of a magnetic head.

Solution to Problem

A cleaning enabling device according to the present invention includes: a holding member including a first surface capable of holding a cleaning member for cleaning a magnetic head, and a second surface capable of lifting a magnetic tape from the magnetic head when the cleaning member is at a cleaning position at which the cleaning can be performed, the holding member being movable between the cleaning position and a retraction position; a transmission unit that transmits a first driving force for driving a first driving member included in a mechanism for performing threading of the magnetic tape, as a second driving force for the movement to the retraction position; and a first force application unit that applies, to the holding member, a first force in a direction that causes the cleaning member to remain in the retraction position when the cleaning member is at the retraction position, and releases the first force when the cleaning member is drawn away from the retraction position.

Advantageous Effects of Invention

A cleaning enabling device according to the present invention is able to reduce a possibility that retraction of a cleaning member occurs and a possibility that the cleaning member fails to return to a retraction position and stops on a way, during cleaning of a magnetic head.

BRIEF DESCRIPTION OF DRAWINGS

FIG. 10 is a block diagram illustrating a minimum configuration of a cleaning enabling device according to an example embodiment.

EXAMPLE EMBODIMENT

A magnetic tape device according to a present example embodiment applies, to a holder of a cleaning member for cleaning a magnetic head, an elastic force for causing the cleaning member to remain in a retraction position, when the holder is at the retraction position. On the other hand, the magnetic tape device according to the present example embodiment does not apply an elastic force in a direction toward the retraction position of the holder, when the holder is at a cleaning position at which the cleaning member cleans the magnetic head. The magnetic tape device according to the present example embodiment performs the above operation by making an angle at which a pin which applies the elastic force to a holder via an arm unit and the like comes into contact with a contact surface different from each other between a time when the holder is at a cleaning position and a time when the holder is at a retraction position (see FIGS. 7 to 9). The contact surface is included in a gear for moving the holder. In the magnetic tape device according to the present example embodiment, it is assumed that an angle of a first contact surface when a holder is at a retraction position is set to an angle at which a pin presses the contact surface by an elastic force in a circumferential direction. On the other hand, it is assumed that an angle of a second contact surface when the holder is at a cleaning position is set to an angle at which the pin cannot press the contact surface by the elastic force in the circumferential direction. Therefore, in the magnetic tape device according to the present example embodiment, a pin does not apply, to a contact surface, an elastic force which causes a gear to rotate for retracting a holder, when a cleaning member is at a cleaning position. Thus, in the magnetic tape device according to the present example embodiment, unintended retraction of a cleaning member does not occur during cleaning of a magnetic head.

In the following, details of the magnetic tape device according to the present example embodiment are described with reference to the drawings.

Figure 1:
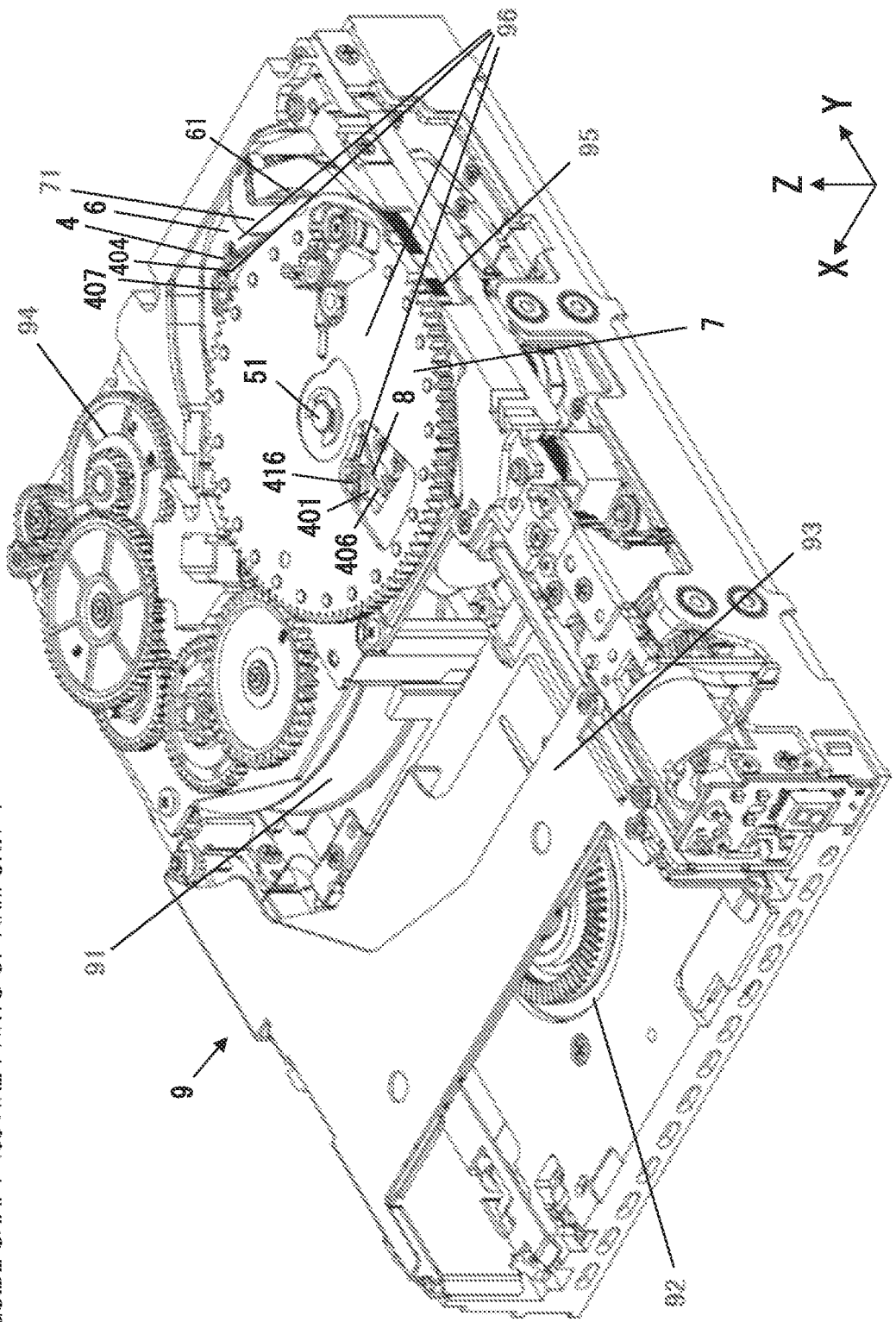
FIG. 1 is a perspective conceptual diagram illustrating a configuration of a magnetic tape device according to a present example embodiment.
Figure 2:
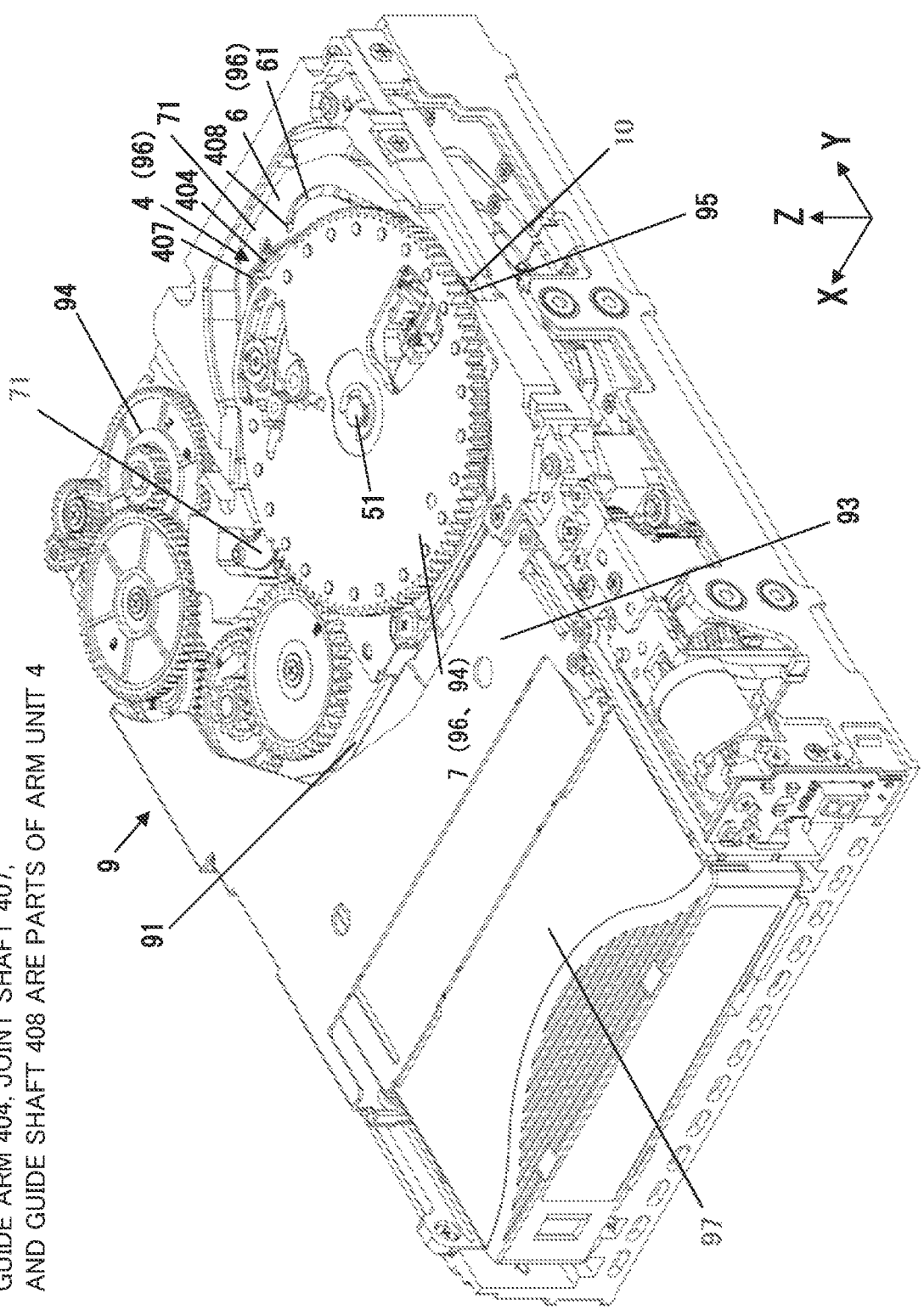
FIG. 2 is a perspective conceptual diagram illustrating the magnetic tape device according to the present example embodiment in which a cartridge is inserted.

FIG. 1 is a perspective conceptual diagram illustrating a configuration of a magnetic tape device 9, which is an example of the magnetic tape device according to the present example embodiment. FIG. 2 is a perspective conceptual diagram illustrating a state that a cartridge 97 is received in the magnetic tape device 9, and a magnetic tape within the cartridge 97 is wound by a reel 91. The above state is a state that threading is completed.

In the following description on the drawings, a plus direction (arrow direction) of X, Y, and Z illustrated in each drawing indicates a same direction. It is assumed that a plus Z direction is an upper direction.

In the following description, a portion other than a portion relating to a cleaning enabling unit 96 relates to a known configuration and operation. Therefore, detailed description of these is omitted.

As illustrated in FIG. 1, the magnetic tape device 9 includes the reel 91 and a reel 92, a loading unit 93, a threading unit 94, a magnetic head unit 95, and the cleaning enabling unit 96.

When the cartridge 97 is received, the loading unit 93 transports the cartridge 97 into the magnetic tape device 9. Further, the loading unit 93 engages an unillustrated gear provided at a bottom portion of the cartridge 97 with a gear provided on the reel 92.

The threading unit 94 moves a threading arm 71 into the cartridge 97 illustrated in FIG. 2 by transmitting a rotational driving force of a driving portion such as an unillustrated motor via a cam gear 7. Then, the threading unit 94 holds an unillustrated pin provided at a leading end of a magnetic tape 10 illustrated in FIG. 2. When the pin is held, the threading unit 94 moves the threading arm 71 to a center of the reel 91, while towing the magnetic tape 10. The magnetic tape 10 towed to the center of the reel 91 by the threading arm 71 is wound into the magnetic tape device 9 from inside the cartridge 97 by rotation of the reels 91 and 92, or wound back in a reverse direction. At this occasion, the reels 91 and 92 are rotated in association with each other in such a way as to pull each other for applying a certain tension to the magnetic tape 10.

The magnetic head unit 95 is disposed in such a way that the magnetic tape 10 in a tensioned state comes into contact with a front surface of an unillustrated magnetic head for enabling recording and reproduction of data recorded on the magnetic tape 10. Then, the magnetic head records or reads a plurality of data strings on or from the magnetic tape 10 by winding of the magnetic tape 10.

The cleaning enabling unit 96 moves an unillustrated cleaning member (such as a brush) for cleaning the magnetic head, and a holder which holds the cleaning member by utilizing a driving force of the threading unit 94. Then, the cleaning enabling unit 96 keeps on moving the holder toward a cleaning position at which cleaning of the magnetic head by the cleaning member can be performed, while keeping (lifting) the magnetic tape 10 away from the magnetic head in a state that the magnetic tape 10 is wound into the device and a tension is applied. Then, the cleaning enabling unit 96 simultaneously completes lifting of the magnetic tape 10 and movement of the cleaning member to the cleaning position.

Although details of a configuration and an operation of the cleaning enabling unit 96 are described later with reference to FIGS. 3 to 9, FIG. 1 illustrates that a part of each of an arm unit 4, a cam plate 6, the cam gear 7, and a latch unit 8 is viewable among components included in the cleaning enabling unit 96. The cam gear 7 is a common component included in the threading unit 94 and the cleaning enabling unit 96.

Figure 6:
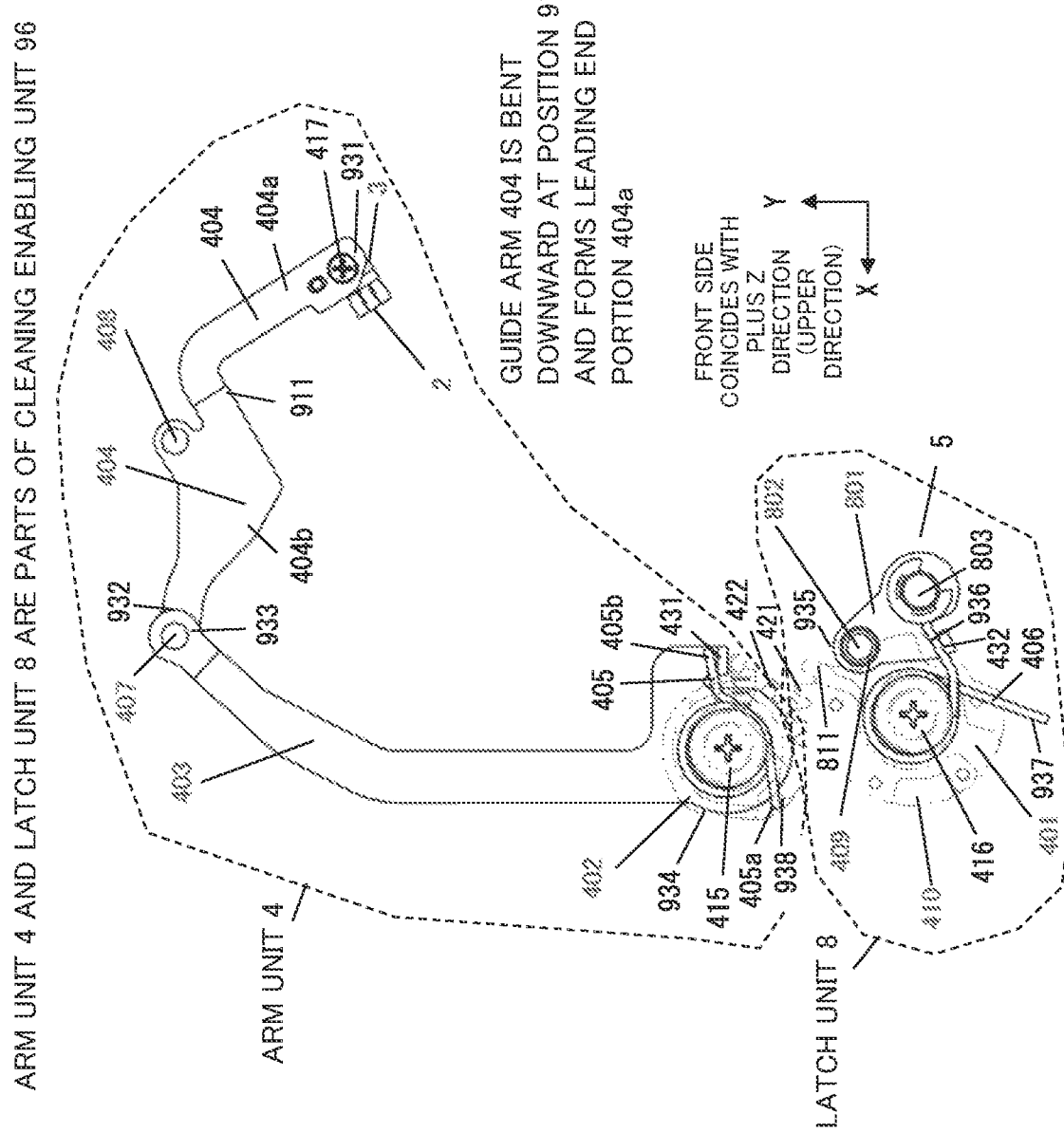
FIG. 6 is a conceptual diagram illustrating a configuration example of an arm unit and a latch unit.

Although details of the arm unit 4 and the latch unit 8 are described later with reference to FIG. 6, FIG. 1 illustrates that a guide arm 404, a joint shaft 407, and a guide shaft 408 are viewable among components included in the arm unit 4 illustrated in FIG. 6. FIG. 1 illustrates that a latch gear 401, a latch spring 406, and a screw 416 are viewable among components included in the latch unit 8 illustrated in FIG. 6.

On the other hand, FIG. 2 illustrates that a part of each of the arm unit 4, the cam plate 6, and the cam gear 7 is viewable among components included in the cleaning enabling unit 96. Although details of the arm unit 4 are described later with reference to FIG. 6, FIG. 2 illustrates that the guide arm 404, the joint shaft 407, and the guide shaft 408 are viewable among components included in the arm unit 4 illustrated in FIG. 6.

The latch unit 8 is hidden in FIG. 2 because a rotational position of the cam gear 7 is different from that in FIG. 1 as a result of threading of the magnetic tape 10 by the threading unit 94.

Figure 3:
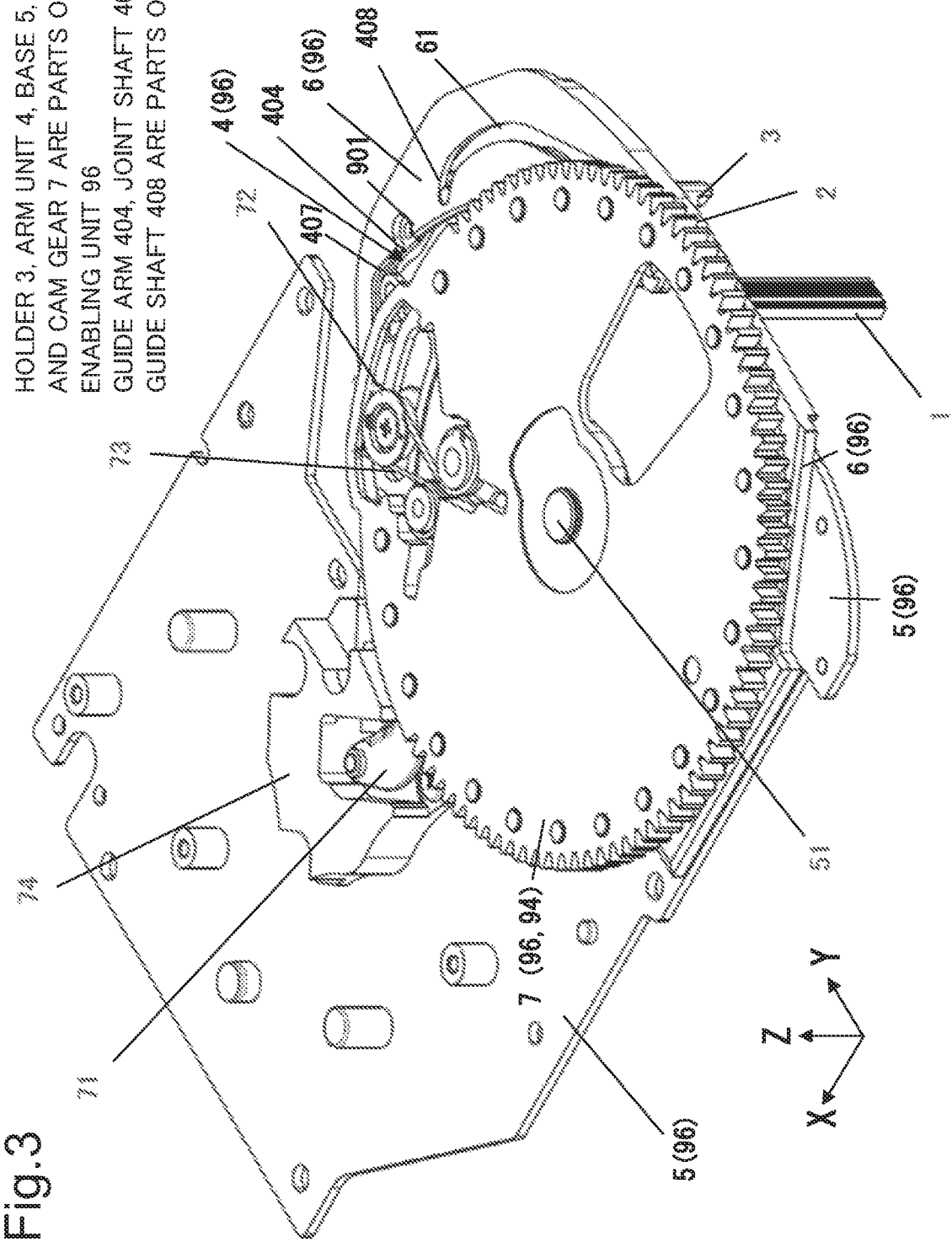
FIG. 3 is a conceptual diagram (part 1) illustrating a configuration of a cleaning enabling unit.
Figure 4:
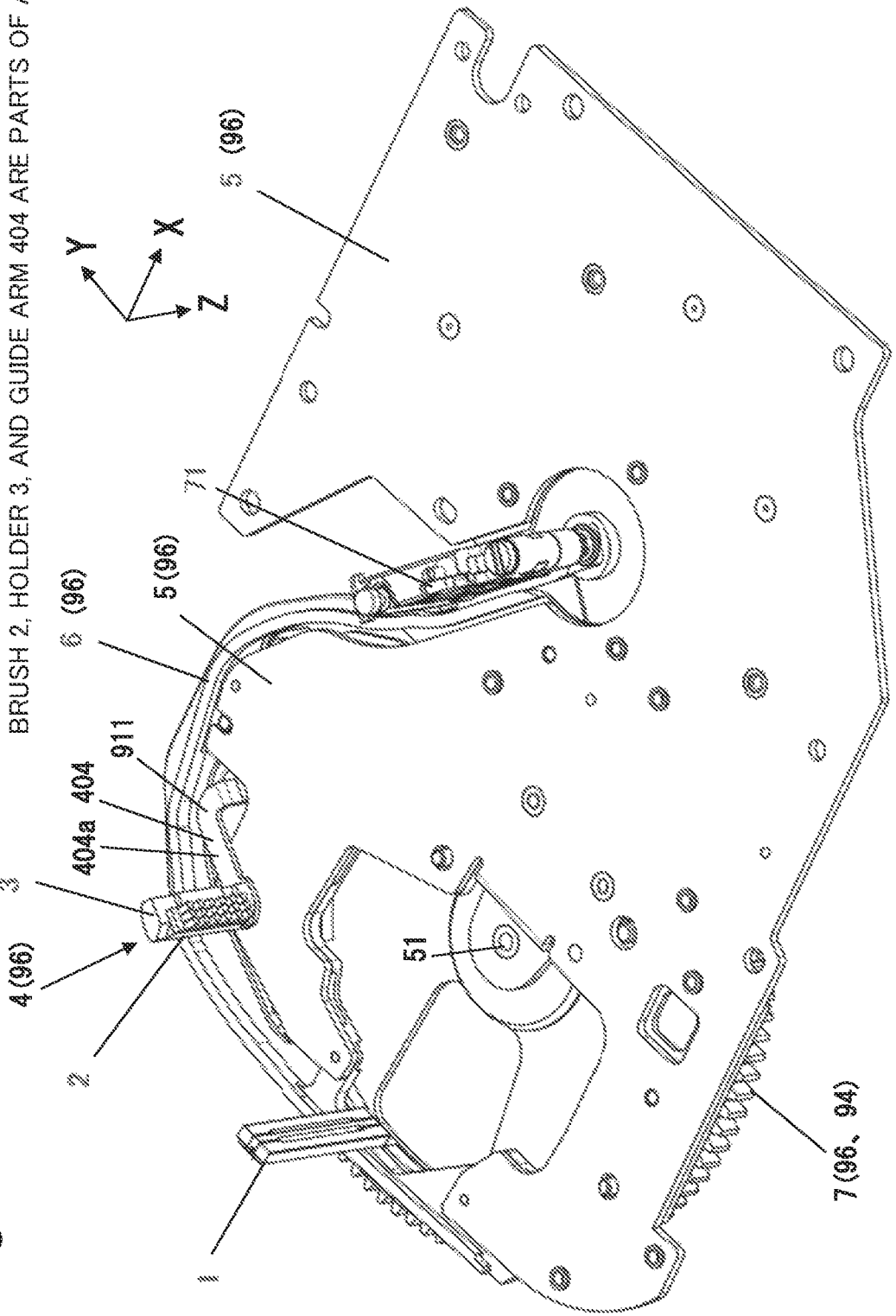
FIG. 4 is a conceptual diagram (part 2) illustrating the configuration of the cleaning enabling unit.

FIG. 3 is a conceptual diagram illustrating a configuration of the cleaning enabling unit 96 illustrated in FIG. 2. FIG. 3 also illustrates a part of a configuration of the threading unit 94. FIG. 4 is a conceptual diagram assuming that a configuration illustrated in FIG. 3 is viewed from below.

The cleaning enabling unit 96 includes a base 5, the cam gear 7, the arm unit 4, and the cam plate 6. The cam gear 7, the arm unit 4, and the cam plate 6 are installed on the base 5.

The cam gear 7 is a gear for driving the threading arm 71 that performs transportation of the magnetic tape 10 illustrated in FIG. 2. The cam gear 7 is also a supply source of a driving force for moving the arm unit 4.

The arm unit 4 is a link mechanism for moving a cleaning member 2 installed on a holder 3 between a front position of a magnetic head 1 and a retraction position. Herein, a direction of a front side of the magnetic head 1 is a minus direction of an X-axis. Details of the arm unit 4 are described later with reference to FIG. 6. FIG. 3 illustrates that the guide arm 404, the joint shaft 407, and the guide shaft 408 included in the arm unit 4 illustrated in FIG. 6 are viewable through a hole 901 formed in the cam plate 6.

Although the cleaning member 2 is, for example, a brush-like member, as far as the cleaning member 2 can clean a magnetic head, anything can be used.

The cam plate 6 is configured to form a guide groove 61 along which movement of the cleaning member 2 illustrated in FIG. 4 is properly guided. The guide groove 61 is an oblong hole. The guide shaft 408 included in the arm unit 4 is received in the guide groove 61. The guide shaft 408 defines a moving path along which the cleaning member 2 and the holder 3 illustrated in FIG. 2 are moved to a position of the magnetic head and a retraction position by moving the guide shaft 408 along the guide groove 61. A specific example of an operation associated with the movement is described later with reference to FIGS. 7 to 9. The hole 901 is formed in the cam plate 6. The hole 901 is configured to prevent the guide arm 404 and the joint shaft 407 of the arm unit 4 from coming into contact with the cam plate 6.

As illustrated in FIG. 4, the cleaning member 2 is mounted on a leading end portion 404a of the arm unit 4 via the holder 3 which holds the cleaning member 2. The leading end portion 404a is a portion located below the base 5 (minus direction of a Z-axis) of the guide arm 404 illustrated in FIG. 6. As illustrated in FIG. 4, the guide arm is bent at a position 911. By the bending, an upper surface (surface directed in a plus direction of the Z-axis) of the leading end portion 404a is kept in parallel to a lower surface (upper surface directed in the minus direction of the Z-axis) of the base 5.

Although illustration is omitted, a surface on a side opposite to a surface of the holder 3 on which the cleaning member 2 is held has a smooth shape and a surface configuration capable of slidably moving the magnetic tape 10 without damaging the magnetic tape 10, when the magnetic tape 10 illustrated in FIG. 2 is moved relative to the cleaning member 2 in contact therewith.

The cam gear 7 is pivotally mounted clockwise and counterclockwise around a cam gear shaft 51 which is press-fitted into the base 5. The cam gear 7 is rotated while a driving force from a driving portion such as an unillustrated motor is transmitted from another gear and the like. The cam gear 7 also holds the threading arm 71 via an OD spring 72 on the threading side and an OD spring 73 on the unthreading side. Herein, OD is abbreviation of overdrive. The cam gear 7 drives the threading arm 71.

The OD spring 72 on the threading side is elastically deformed when the threading arm 71 driven by counterclockwise rotation of the cam gear 7 is further driven from a position where the threading arm 71 is abutted against a threading stopper 74 which defines a threading completion position. By the elastic deformation, the OD spring 72 on the threading side allows the cam gear 7 to further rotate from the threading completion position.

The OD spring 73 on the unthreading side is elastically deformed when the threading arm 71 driven by clockwise rotation of the cam gear 7 is further driven from a position where the threading arm 71 is abutted against an unillustrated unthreading stopper which defines an unthreading completion position. By the elastic deformation, the OD spring 73 on the unthreading side allows the cam gear 7 to be further driven beyond the unthreading completion position.

Since the threading arm 71, and a configuration in which the magnetic tape 10 illustrated in FIG. 2 is drawn out of the cartridge 97 and towed by the threading arm 71 are known as a threading method, detailed description thereof is omitted.

Figure 5:
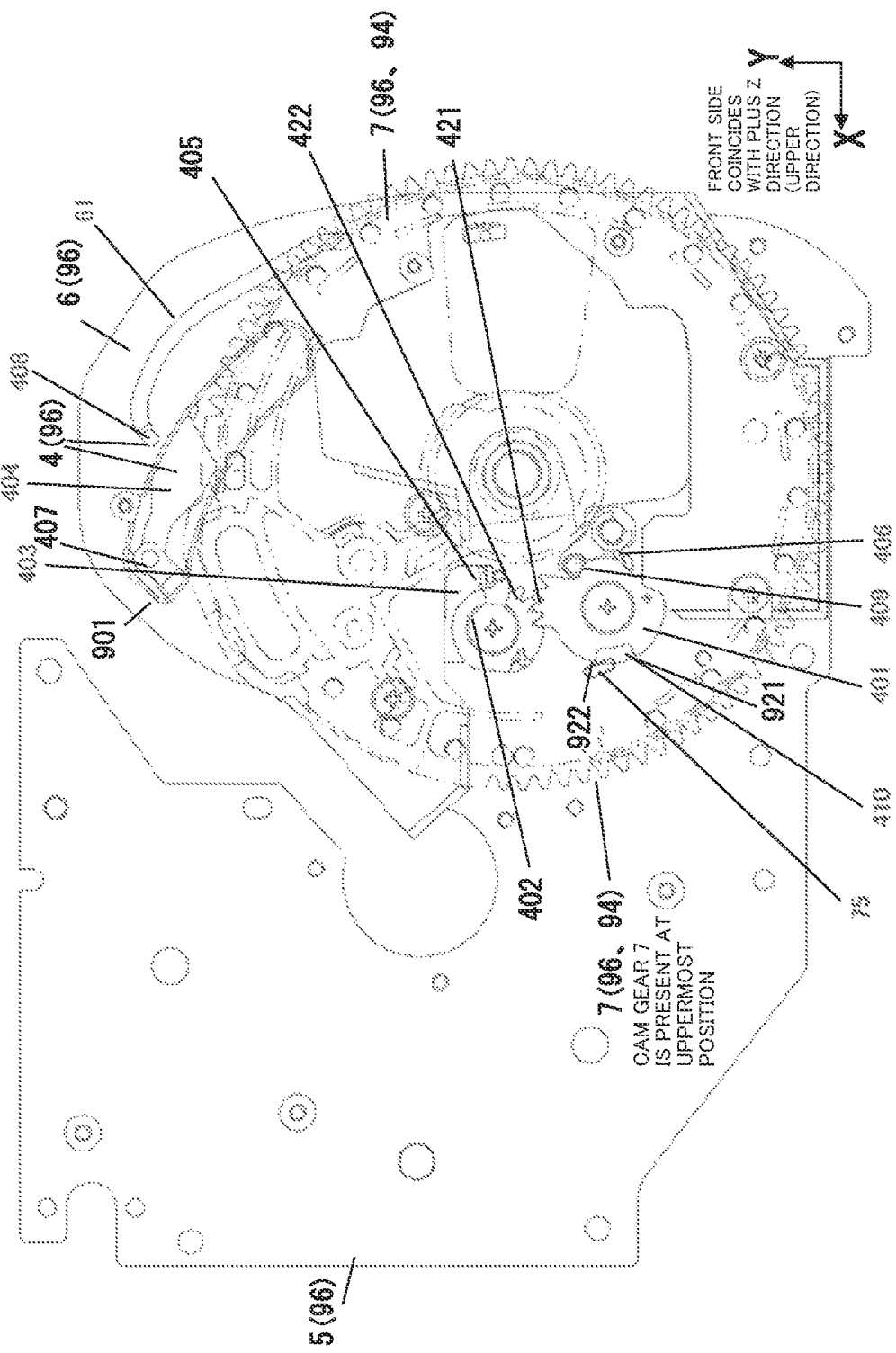
FIG. 5 is a top plan perspective view illustrating a portion equivalent to FIG. 3.

FIG. 5 is a top plan view of a portion illustrated in FIG. 3 in which a portion below the cam gear 7 is perspectively viewed through the cam gear 7. In FIG. 5, a configuration other than the cam gear 7 is not perspectively viewed. In FIG. 5, the threading arm 71, the OD spring 72 on the threading side, and the OD spring 73 on the unthreading side illustrated in FIG. 3 are not illustrated.

Details of the arm unit 4 are described later with reference to FIG. 6. FIG. 5 illustrates that the latch gear 401, a swing gear 402, a swing arm 403, the guide arm 404, and the latch unit 8 are viewable among components of the arm unit 4 illustrated in FIG. 6. The latch gear 401 and the swing gear 402 respectively have a tooth 421 and a tooth 422 being partial teeth. The tooth 421 and the tooth 422 mesh with each other.

The swing gear 402 and the swing arm 403 are connected via a buffer spring 405. The swing gear 402 and the swing arm 403 are rotatable in the same directions as each other by transmission of a rotational force via the buffer spring 405.

A latch lever 801 is biased counterclockwise by a latch spring 406. By the biasing, the latch lever 801 presses a latch cam unit 409 provided on an outer periphery of the latch gear 401.

A cam gear pressing unit 410 is formed in the latch gear 401, as a concave shape recessed downward. A latch gear pressing unit 75 is formed on a lower surface of the cam gear 7, as a convex shape protruding downward.

An end portion 921 of the cam gear pressing unit 410 is pressed against the latch gear pressing unit 75, when the cam gear 7 is rotated counterclockwise to a predetermined rotational position (rotational position overdriven beyond a threading completion rotational position) after threading is completed. By the pressing, the latch gear 401 is rotated counterclockwise. Consequently, the swing gear 402, and the arm unit 4 connected to the swing gear 402 are rotated clockwise. By the rotation, the cleaning member 2 fixed to the arm unit 4 and illustrated in FIGS. 3 and 4 reaches a cleaning position at which the cleaning member 2 comes into contact with the magnetic head 1 illustrated in FIG. 3 while facing the magnetic head 1. A restriction mechanism which restricts counterclockwise rotation of the cam gear 7 is provided to prevent the latch gear pressing unit 75 from excessively pressing the end portion 921 of the cam gear pressing unit 410 by further counterclockwise rotation of the cam gear 7. The restriction mechanism is, for example, a mechanism for detecting a stopper which stops rotation of the cam gear 7, and a rotational angle of the cam gear 7, and stopping rotation of an unillustrated motor which drives the cam gear 7.

Herein, rotation of the cam gear 7 is stopped, and the arm unit 4 and the cleaning member 2 fixed thereto are held at a cleaning position. In this state, the head 1 is moved up and down by an unillustrated elevation mechanism, and cleaned by the cleaning member 2.

When cleaning is finished, an end portion 922 of the cam gear pressing unit 410 is rotated clockwise from a rotational position at which the cam gear 7 is overdriven, and pressed against the latch gear pressing unit 75 at a time of returning to a rotational position where threading is completed. By the pressing, the latch gear 401 is rotated clockwise. Consequently, the swing gear 402, and the arm unit 4 connected to the swing gear 402 are rotated counterclockwise. Then, the cleaning member 2 fixed to the arm unit 4 is moved to a retraction position. After the pressing, the latch gear pressing unit 75 is disengaged from the end portion 921 of the cam gear pressing unit 410 by further clockwise rotation of the cam gear 7, and rotated further clockwise. A shape of the latch gear pressing unit 75 and the end portion 921 of the cam gear pressing unit 410 is set to such a shape that the latch gear pressing unit 75 is disengaged from the end portion 921 of the cam gear pressing unit 410 by the clockwise rotation of the cam gear 7.

FIG. 6 is a conceptual diagram illustrating a configuration example of the arm unit 4 and the latch unit 8. FIG. 6 illustrates as if a portion of the arm unit 4 and the latch unit 8 below the latch gear 401 and the swing gear 402 are perspectively viewed. An operation of the arm unit 4 and the latch unit 8 incorporated in the magnetic tape device is described later with reference to FIGS. 7 to 9.

The latch unit 8 includes the latch gear 401, the latch spring 406, a latch lever 801, and a latch pin 802.

The latch lever 801 is connected to a shaft 803 in such a way as to be pivotable around the shaft 803 fixed to the base 5. The latch pin 802 is provided in a vicinity of a position 935 of the latch lever 801. The latch pin 802 protrudes upward of the latch lever 801.

The latch spring 406 is installed coaxially with the latch gear 401 at a lower portion of the latch gear 401 by the screw 416.

A vicinity of a position 936 of the latch spring 406 is supported by a vertical bending portion 432 of the latch lever 801. The vertical bending portion 432 protrudes upward of the latch lever 801. A vicinity of a position 937 of the latch spring 406 is supported by an unillustrated member fixed to the base 5. The member is, for example, a part of the cam plate 6 illustrated in FIG. 5.

By the above configuration, the latch spring 406 is elastically deformed. In a case where a counterclockwise rotational driving force is not transmitted from the cam gear 7 to the latch gear 401, and the holder 3 is at a retraction position, the latch pin 802 presses a surface 811 of the latch cam unit 409 formed on an outer periphery of the latch gear 401 by a restoring force of the elastic deformation. Herein, a case where the holder 3 is at a retraction position is equivalent to a case of FIG. 7 to be described later.

Figure 7:
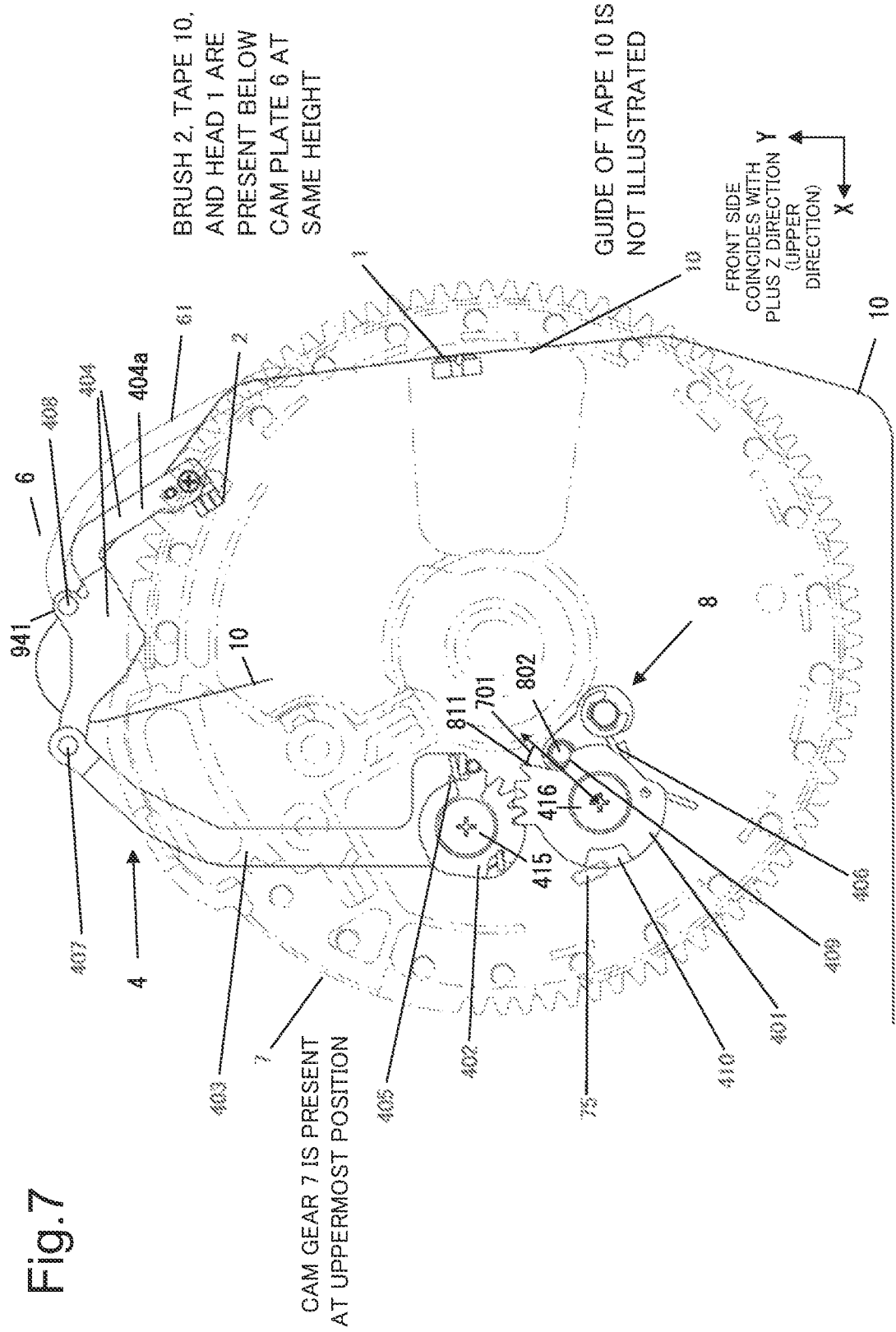
FIG. 7 is a conceptual diagram illustrating a state of the arm unit and the latch unit in a standby state.

On the other hand, in a case where a counterclockwise rotational driving force is transmitted from the cam gear 7 to the latch gear 401 (case of FIGS. 8 and 9 to be described later), although the case is not illustrated in FIG. 7, the latch gear 401 is rotated counterclockwise. Therefore, the surface 811 does not come into contact with the latch pin 802. In this case, pressing of the surface 811 by the latch pin 802 is not performed.

As described above, the latch gear 401 includes the tooth 421. The tooth 421 is in mesh with the tooth 422 of the swing gear 402. Therefore, rotation of the latch gear 401 in a certain rotational direction generates rotation of the swing gear 402 in a reverse rotational direction.

On the other hand, the arm unit 4 includes the cleaning member 2, the holder 3, the swing gear 402, the swing arm 403, the guide arm 404, and the buffer spring 405.

As described above, the swing gear 402 includes the tooth 422. The tooth 422 is in mesh with the tooth 421 of the latch gear 401. Therefore, the swing gear 402 is rotated in a reverse rotational direction by rotation of the latch gear 401 in a certain rotational direction.

The guide arm 404 serves as the leading end portion 404a by being bent downward from a root portion 404b and being bent downward again in a vicinity of a position 911 (see FIG. 4). The root portion 404b and the leading end portion 404a are in parallel to each other.

The holder 3 (see FIG. 4) is fixed to a vicinity of a position 931 of the leading end portion 404a by a screw 417. The cleaning member 2 is fixed to a front surface (left surface) of the holder 3 (see FIG. 4).

The guide shaft 408 is press-fitted in the root portion 404b. The press-fitted guide shaft 408 protrudes upward of the root portion 404b. The protrusion of the guide shaft 408 is the guide shaft 408 illustrated in FIGS. 2, 3, and 5, and is a portion assumed to be received in the guide groove 61. The protrusion is formed into a cylindrical shape having an outer diameter slightly narrower than a width of the guide groove 61. Therefore, the guide arm 404 is configured in such a way that the guide shaft 408 is movable along the guide groove 61. A shape of the guide groove 61 is formed in such a way that the cleaning member 2 and the holder 3 are moved while avoiding structural parts of the magnetic tape device, and the cleaning member 2 is allowed to come into contact with the magnetic head 1.

The joint shaft 407 is press-fitted in a vicinity of a position 932 of the guide arm 404. The joint shaft 407 is received in such a way that the joint shaft 407 is rotatable and does not come out of a hole formed in a vicinity of a position 933 of the swing arm 403.

The swing arm 403 is coaxially supported with the swing gear 402 at a vicinity of a position 934 by a screw 415.

The buffer spring 405 is coaxially provided between the swing gear 402 and the swing arm 403. The buffer spring 405 is provided in such a way that a vicinity of an end portion 405a is hooked at a position 938 of the swing gear 402, and an end portion 405b is hooked at a vertical bending unit 431 of the swing arm 403, by a restoring force of elastic deformation. A rotational force to be transmitted from the cam gear 7 illustrated in FIG. 5 to the swing gear 402 via the latch gear 401 is transmitted to the swing arm 403 via the buffer spring 405. Then, by the rotational force, the swing arm 403 is rotated and driven. The rotational force of the swing arm 403 is transmitted to the guide arm 404 via the joint shaft 407. Therefore, the guide arm 404 is also driven in association with the swing arm 403. As described above, the driving is performed in such a way that the guide shaft 408 moves along the guide groove 61 illustrated in FIGS. 2, 3, and 5.

As will be described later with reference to FIGS. 8 and 9, by the driving of the guide arm 404, the guide shaft 408 is abutted against an end portion of the guide groove 61.

When a driving force is further applied to the swing arm 403 in the same direction, the buffer spring 405 is further elastically deformed by receiving the driving force. The buffer spring 405 avoids that the arm unit 4 and the like are locked by the elastic deformation, as will be described later.

Next, a cleaning enabling operation of a magnetic head by the arm unit 4 and the latch unit 8 illustrated in FIG. 6 is described with reference to FIGS. 7 to 9.

FIG. 7 is a conceptual diagram illustrating a state of the arm unit 4 and the latch unit 8 in a case where the arm unit 4 illustrated in FIG. 6 is in a standby state. FIGS. 7 to 9 illustrate as if a portion of the arm unit 4 and the latch unit 8 below the cam gear 7 and the cam plate 6 are also perspectively viewed. Only an outer shape of the guide groove 61 in the cam plate 6 is illustrated. The threading arm 71, the OD spring 72 on the threading side, the OD spring 73 on the unthreading side, the threading stopper 74, and other components of the magnetic tape device 9 are not illustrated.

The state illustrated in FIG. 7 is equivalent to the state of the magnetic tape device 9 illustrated in FIG. 2. In this state, the threading arm 71 towing the magnetic tape 10 from the cartridge 97 illustrated in FIG. 2 comes into contact with the threading stopper 74, and completes threading. The magnetic tape 10 illustrated in FIG. 7 is a lateral surface in the state (in a film thickness direction). A shape of the magnetic tape 10 is formed by applying a tension to the magnetic tape 10 in a state that a surface of the magnetic tape 10 is in contact with an unillustrated guide. The magnetic tape 10 is at a same height position as the cleaning member 2 and the magnetic head 1. The height position is below the cam gear 7 and the cam plate 6 which is further below the cam gear 7.

In the state illustrated in FIG. 7, the latch gear pressing unit 75 formed on the cam gear 7, and the cam gear pressing unit 410 formed on the latch gear 401 are not in contact with each other. On the other hand, the latch cam unit 409 of the latch gear 401 is pressed against the latch pin 802 of the latch unit 8 biased by the latch spring 406.

The surface 811 of the latch cam unit 409 in contact with the latch pin 802 is formed in such a way that an angle in a radial direction of the latch gear 401 is equal to an angle 701. Therefore, a clockwise rotational force is applied to the latch gear 401 by a pressing force of the latch pin 802. Then, a counterclockwise rotational force is applied to the swing gear 402 in mesh with the latch gear 401. Then, a counterclockwise rotational force is applied to the swing arm 403 and the guide arm 404. Therefore, the guide shaft 408 provided on the guide arm 404 is abutted and held at a position 941 being a start position of the guide groove 61. Thus, the cleaning member 2 is held at a predetermined retraction position.

Figure 8:
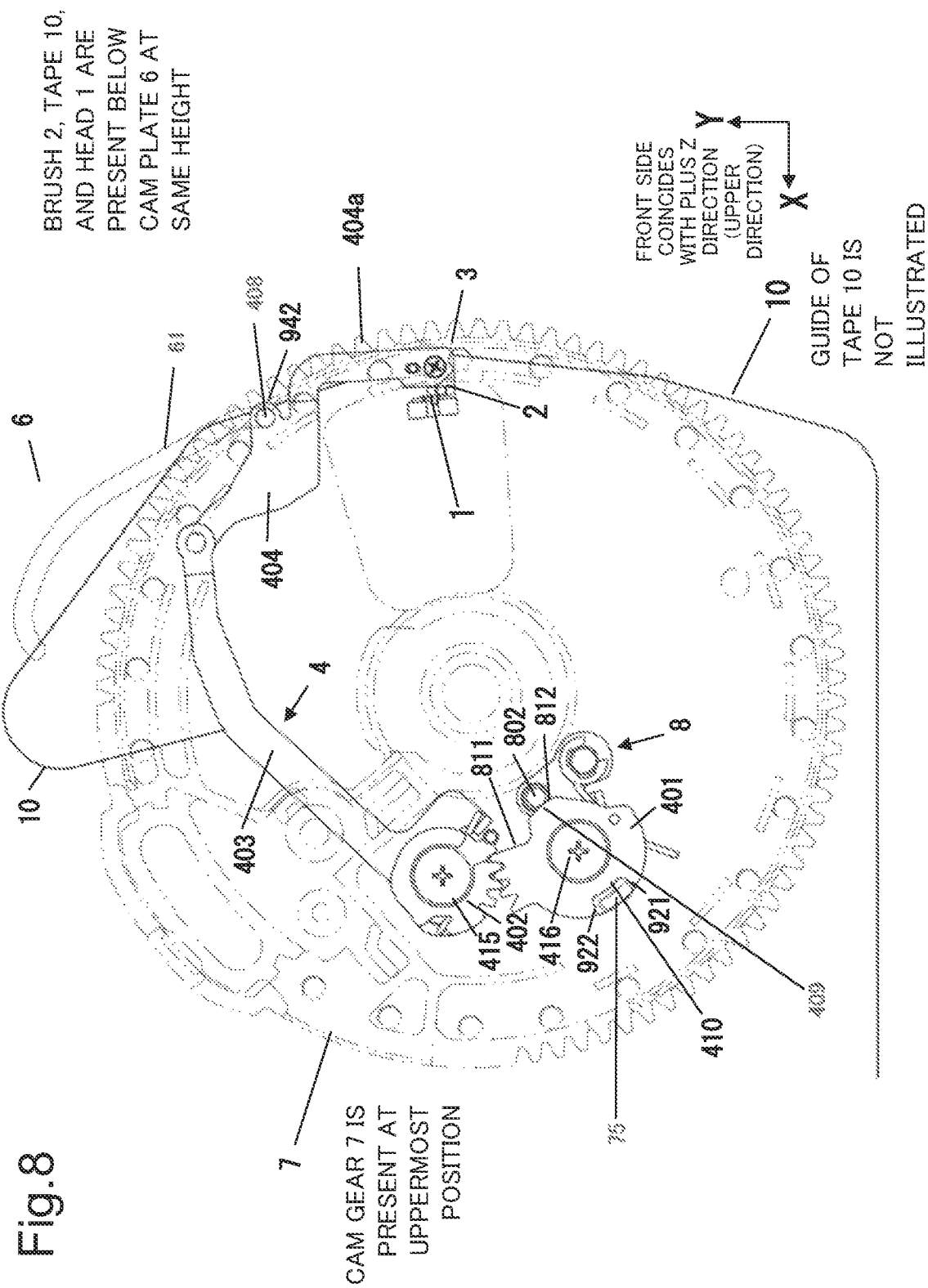
FIG. 8 is a conceptual diagram illustrating a state of the arm unit and the latch unit when a cam gear is overdriven counterclockwise.

FIG. 8 is a conceptual diagram illustrating a state of the arm unit 4 and the latch unit 8, when the cam gear 7 is overdriven counterclockwise from the state illustrated in FIG. 7. As described above, overdrive means that the cam gear 7 is rotated beyond a threading completion rotational position.

In the state illustrated in FIG. 8, the latch gear pressing unit 75 of the cam gear 7 presses the end portion 921 of the cam gear pressing unit 410 of the latch gear 401 counterclockwise of the cam gear 7. Therefore, the latch gear 401 is rotated counterclockwise. Then, the swing gear 402 in mesh with the latch gear 401 is rotated clockwise. Therefore, a clockwise rotational force is applied from the swing gear 402 to the swing arm 403 and the guide arm 404. Consequently, the swing arm 403 and the guide arm 404 are rotated clockwise. The rotation of the guide arm 404 is performed in such a way that the guide shaft 408 moves along the guide groove 61. Then, the guide shaft 408 provided on the guide arm 404 is abutted against a position 942 being a peripheral end position of the guide groove 61.

At a time of the movement of the holder 3, the magnetic tape 10 is present on a moving path of the holder 3. A certain tension is applied to the magnetic tape 10 by an unillustrated magnetic tape winding motor. The holder 3 is moved, while pushing away the magnetic tape 10 against the tension by a back surface of a cleaning member holding unit (surface on a side opposite to a surface of the holder 3 illustrated in FIG. 4, on which the cleaning member 2 is installed). As described above, since the back surface has a smooth shape and a surface configuration capable of slidably moving the magnetic tape 10 without damaging the magnetic tape 10, the magnetic tape 10 is not damaged by the movement.

By the pushing-away, the magnetic tape 10 in contact with the magnetic head 1 in FIG. 7 is set to a state that the magnetic tape 10 is pushed away from the magnetic head 1, as illustrated in FIG. 8. Simultaneously, the cleaning member 2 reaches a cleaning position, and comes into contact with the magnetic head 1 from the front side. By moving the magnetic head 1 in an up-down direction (Z direction) in this state, for example, the magnetic head 1 is cleaned. A portion which holds the magnetic head 1 is provided with an unillustrated mechanism for the elevational movement.

By counterclockwise rotation of the latch gear 401, a surface of the latch cam unit 409 in contact with the latch pin 802 shifts from the surface 811 to an arc-shaped surface 812 concentric with a rotational axis of the latch gear 401. In this state, a pressing force applied from the latch pin 802 to the latch gear 401 acts in a circumferential direction of the rotational axis of the latch gear 401, and only a frictional force generated from a reaction force of the pressing force acts in a rotational direction. Therefore, a counterclockwise rotational force for moving the cleaning member 2 to a retraction position is not applied to the swing gear 402, the swing arm 403, and the guide arm 404.

Figure 9:
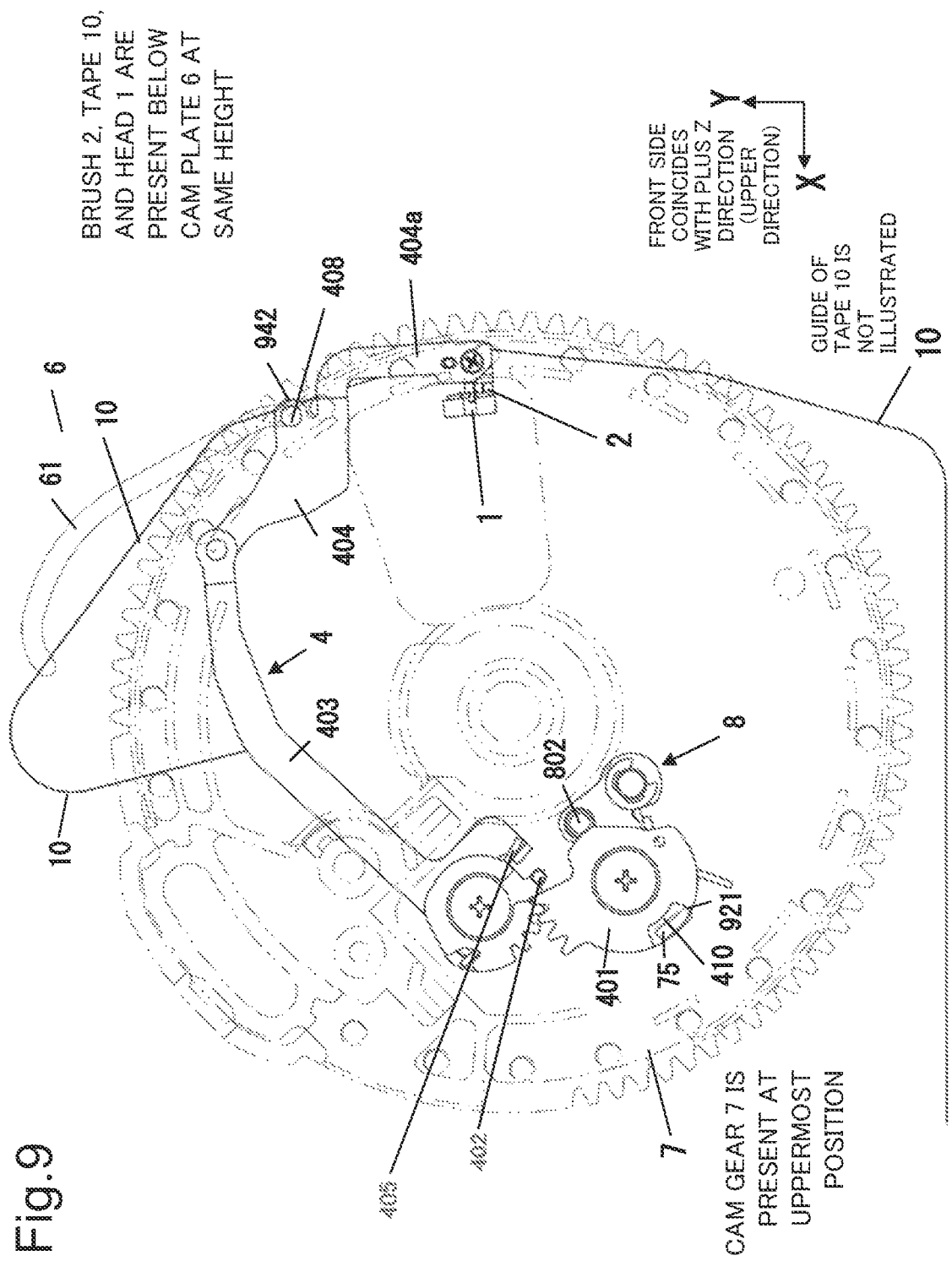
FIG. 9 is a conceptual diagram illustrating a state of the arm unit and the latch unit when the cam gear is overdriven further counterclockwise.

FIG. 9 is a conceptual diagram illustrating a state of the arm unit 4 and the latch unit 8, when the cam gear 7 is overdriven further counterclockwise from the state illustrated in FIG. 8. By the further overdrive of the cam gear 7, the end portion 921 of the cam gear pressing unit 410 is continued to be pressed by the latch gear pressing unit 75 of the cam gear 7, and the latch gear 401 is further rotated counterclockwise.

Therefore, the swing gear 402 in mesh with the latch gear 401 is further rotated clockwise. By the rotation, a rotational force for further rotating the swing arm 403 and the guide arm 404 clockwise is generated via the buffer spring 405.

However, in this state, the guide shaft 408 is abutted at the position 942 being an end position of the guide groove 61, and cannot be moved any more. Therefore, the swing arm 403 and the guide arm 404 cannot be rotated clockwise any more.

Since the swing gear 402 is rotated clockwise, and the swing arm 403 is not rotated, the buffer spring 405 provided therebetween is deformed. By the deformation, a restoring force of the deformation is accumulated in the buffer spring 405.

In this state, the cam gear 7 stops its rotation. As described above, the stopping is by an unillustrated restriction mechanism which restricts rotation of the cam gear 7. As described above, the restriction mechanism is, for example, a mechanism for detecting a stopper which stops excessive rotation of the cam gear 7, and a rotational angle of the cam gear 7, and stopping rotation of an unillustrated motor which drives the cam gear 7.

In this way, the buffer spring 405 is elastically deformed to thereby prevent that an excessive force is applied to the cam gear 7, the latch gear 401, the swing gear 402, the swing arm 403, and the guide arm 404 by overdrive of the cam gear 7. When an excessive force is applied to these members, these members may be damaged, broken, and the like. The buffer spring 405 prevents damage, breakage, and the like of these members by elastic deformation.

Since rotation of the cam gear 7 is stopped, a restoring force of the buffer spring 405 accumulated by overdrive of the cam gear 7 acts on the swing arm 403 and the guide arm 404 in a direction for guiding the cleaning member 2 to a cleaning position. Therefore, the buffer spring 405 also functions to prevent a play between the swing arm 403 and the guide arm 404, and between the guide shaft 408 and the guide groove 61 at a time of cleaning.

Advantageous Effect

A magnetic tape device according to the present example embodiment performs retraction of a cleaning member to a retraction position by a rotational driving force of a cam gear being a rotational member for driving a threading arm. Since the magnetic tape device does not perform retraction of a cleaning member by a restoring force of a spring, there is no likelihood that a holder fails to return to a retraction position and stops on a way in a case where sliding performance is deteriorated due to repeated use like a case where retraction is performed by a restoring force of a spring. Specifically, the magnetic tape device is able to reduce a possibility that a holder fails to return to a retraction position and stops on a way.

The tape device causes a latch unit to apply, to the arm unit, a force which acts in a direction for retracting a cleaning member and maintains retraction of the cleaning member only when the cleaning member is at a retraction position. As described in the section of Technical Problem, even in a mechanism in which a mechanism for the lifting and a mechanism for the movement are not independently provided, a case may occur in which unintended retraction of a cleaning member is performed depending on a structure of the mechanism. Such a mechanism is, for example, a case where a restoring force by a spring may act in a direction for retracting a cleaning member at a cleaning position. Since the magnetic tape device according to the present example embodiment applies a force in a direction that causes a cleaning member to retract only when the cleaning member is at a retraction position, it is possible to prevent such unintended retraction of the cleaning member.

Further, the magnetic tape device includes, in an arm unit, a buffer spring between a swing gear and a swing arm. When an excessive force is applied between a driving portion of a cam gear and a guide arm, the buffer spring alleviates the force by elastic deformation. Therefore, the buffer spring prevents damage and the like generated in a configuration between the driving portion and the guide arm due to application of an excessive force between the cam gear and the guide arm.

The magnetic tape device moves a cleaning member for magnetic head cleaning to a magnetic head cleaning position in a state that threading is completed and a tension is applied to a magnetic tape. The magnetic tape device performs the movement by lifting the magnetic tape from a magnetic head by a holder which holds the cleaning member without unthreading the magnetic tape or loosening the tension to the magnetic tape. Thus, the magnetic tape device is able to clean the magnetic head, while maintaining a traveling state or a stopping state of the magnetic tape.

In the magnetic tape device, lifting of a magnetic tape from a magnetic head, and movement of a cleaning member to a cleaning position are performed by a latch unit and an arm unit having a simple structure. Herein, the latch unit is a portion which transmits, to the arm unit, a driving force for allowing the magnetic tape device to perform threading and unthreading, and achievable by a simple configuration constituted of a latch lever, a latch gear, and a latch spring. The arm unit is a portion which moves a cleaning member between a retraction position and a cleaning position, and achievable by a simple configuration constituted of a swing gear, a lock prevention spring, a swing arm, a guide arm, a holder, and the cleaning member. Therefore, the magnetic tape device provides an advantageous effect that cleaning of a magnetic head can be performed by a simple mechanism without unthreading a magnetic tape.

The magnetic tape device performs both of the lifting and the movement by combination of an arm unit and a latch unit. Specifically, the magnetic tape device is not independently provided with a mechanism for the lifting and a mechanism for the movement. Therefore, the magnetic tape device is able to suppress an increase in the production cost, and an increase in a device size.

The magnetic tape device employs a common cam gear and driving portion thereof for a cleaning unit which performs the lifting and the movement, and a threading unit which performs threading and unthreading of a magnetic tape. Therefore, the magnetic tape device is able to achieve further simplification or miniaturization of a driving mechanism. Thus, the magnetic tape device is able to further suppress an increase in the production cost and an increase in the device size.

FIG. 10 is a block diagram illustrating a configuration of a cleaning enabling device 96*x* being a minimum configuration of a cleaning enabling device according to an example embodiment.

The cleaning enabling device 96*x* includes a holding member 3*x*, a transmission unit 851*x*, and a first force application unit 856*x*.

The holding member 3*x* includes a first surface capable of holding a cleaning member for cleaning a magnetic head, and a second surface capable of lifting a magnetic tape from the magnetic head when the cleaning member is at a cleaning position at which the cleaning can be performed, and is movable between the cleaning position and a retraction position.

The transmission unit 851*x* transmits a first driving force for driving a first driving member included in a mechanism for performing threading of the magnetic tape, as a second driving force for the movement to the retraction position.

The first force application unit 856*x* applies, to the holding member, a first force in a direction that causes the cleaning member to remain in the retraction position when the cleaning member is at the retraction position, and releases the first force when the cleaning member is drawn away from the retraction position.

The cleaning enabling device 96*x* performs retraction of a cleaning member to a retraction position by a first driving force for driving the first driving member. Since the cleaning enabling device 96*x* does not perform retraction of a cleaning member by a restoring force of a spring, there is no likelihood that a holder fails to return to a retraction position and stops on a way in a case where sliding performance is deteriorated due to repeated use like a case where retraction is performed by a restoring force of a spring, and the like. Specifically, the cleaning enabling device 96x is able to reduce a possibility that a holder fails to return to a retraction position and stops on a way.

The cleaning enabling device 96x releases the first force in a direction that causes the cleaning member to remain in the retraction position, when the cleaning member is at the cleaning position. Therefore, it is possible to reduce a possibility that retraction of a cleaning member occurs during cleaning of a magnetic head.

Thus, the cleaning enabling device 96x provides, by the above-described configuration, an advantageous effect described in the section of [Advantageous Effect of Invention].

The cleaning enabling device 96x is, for example, the cleaning enabling unit 96 illustrated in FIGS. 1 to 6.

The holding member 3x is, for example, the holder 3 illustrated in FIGS. 4, 6, and 8.

The transmission unit 851x is, for example, combination of the latch gear 401, the swing gear 402, the buffer spring 405, the swing arm 403, and the guide arm 404 illustrated in FIG. 6.

The first force application unit 856x is, for example, combination of the latch spring 406, the latch lever 801, and the latch pin 802.

The magnetic head is, for example, the magnetic head 1 illustrated in FIGS. 7 to 9.

The cleaning member is, for example, the cleaning member 2 illustrated in FIGS. 4, and 6 to 9.

The first surface is, for example, a surface illustrated in FIG. 4, on which the cleaning member 2 is provided.

The second surface is, for example, a back surface illustrated in FIG. 4, of the surface on which the cleaning member 2 is provided.

The magnetic tape is, for example, the magnetic tape 10 illustrated in FIGS. 2, and 7 to 9.

The cleaning position is, for example, a position illustrated in FIGS. 8 and 9, at which the cleaning member 2 is present.

The retraction position is, for example, a position illustrated in FIG. 7, at which the cleaning member 2 is present.

The mechanism is, for example, the threading unit 94 illustrated in FIGS. 1 to 5.

The first driving member is, for example, the cam gear 7 illustrated in FIGS. 1 to 5, and FIGS. 7 to 9.

In the foregoing, example embodiments according to the present invention have been described. However, the present invention is not limited to the above-described example embodiment, and further modification, replacement, and adjustment can be added within the scope of the basic technical idea of the present invention. For example, a configuration of an element illustrated in each drawing is one example for aiding understanding of the present invention, and the present invention is not limited to a configuration illustrated in these drawings.

A part or all of the above-described example embodiment may also be described as the following supplementary notes, but are not limited to the following.

(Supplementary Note 1)

A cleaning enabling device including:

a holding member including a first surface capable of holding a cleaning member for cleaning a magnetic head, and a second surface capable of lifting a magnetic tape from the magnetic head when the cleaning member is at a cleaning position at which the cleaning can be performed, the holding member being movable between the cleaning position and a retraction position;

a transmission unit that transmits a first driving force for driving a first driving member included in a mechanism for performing threading of the magnetic tape, as a second driving force for the movement to the retraction position; and a first force application unit that applies, to the holding member, a first force in a direction that causes the cleaning member to remain in the retraction position when the cleaning member is at the retraction position, and releases the first force when the cleaning member is drawn away from the retraction position.

(Supplementary Note 2)

The cleaning enabling device according to supplementary note 1, further including a path defining unit that determines a path of the movement.

(Supplementary Note 3)

The cleaning enabling device according to supplementary note 1 or 2, further including:

a first arm being rotatably connected to a first shaft at a first position, and being rotatably connected to a third position of a second arm at a second position; and a second arm including the cleaning member at a fourth position, wherein the first driving member is a first rotational member being rotatable around a second shaft, the first driving force is a first rotational force for rotating the first rotational member around the second shaft, and the second driving force is a second rotational force for driving the first arm around the first shaft.

(Supplementary Note 4)

The cleaning enabling device according to supplementary note 3, wherein the transmission unit includes:

a first gear being rotatable around a third shaft; and a second gear being in mesh with the first gear and being rotatable around the first shaft, the first gear transmits the second rotational force to the second gear, as a third rotational force around the first shaft, and the second gear transmits the third rotational force to the first arm, as the second rotational force.

(Supplementary Note 5)

The cleaning enabling device according to supplementary note 4, wherein the first force application unit includes a combination of a rotational member being rotatable around a fourth shaft and having a vicinity of a fifth position in contact with a predetermined rotational surface of the first gear, and a first elastic member, and the rotational member generates the first force by a first elastic force of the first elastic member.

(Supplementary Note 6)

The cleaning enabling device according to supplementary note 5, wherein the rotational member has a lever shape.

(Supplementary Note 7)

The cleaning enabling device according to supplementary note 5 or 6, wherein the first elastic member is a first spring.

(Supplementary Note 8)

The cleaning enabling device according to any one of supplementary notes 5 to 7, wherein the rotational surface includes a first rotational lateral surface in which an angle with respect to a radial direction of rotation of the first gear around the fourth shaft is a first angle, and a second rotational lateral surface in which the angle is a second angle smaller than the first angle, and, when a vicinity of the fifth position is in contact with the second rotational lateral surface, the first force is applied to the holding member, and when a vicinity of the fifth position is in contact with the first rotational lateral surface, the first force is released.

(Supplementary Note 9)

The cleaning enabling device according to any one of supplementary notes 1 to 8, further including a second elastic member that transmits the first driving force between the first driving member and the holding member, as the second driving force.

(Supplementary Note 10)

The cleaning enabling device according to supplementary note 9, wherein when an excessive force is applied between the holding member and a component included in the mechanism, the second elastic member alleviates the excessive force by deformation of the second elastic member.

(Supplementary Note 11)

The cleaning enabling device according to supplementary note 9 or 10, wherein the second elastic member is a second spring.

(Supplementary Note 12)

The cleaning enabling device according to supplementary note 4, further including a second elastic member that transmits the third rotational force between the second gear and the first arm, as the second rotational force.

(Supplementary Note 13)

The cleaning enabling device according to supplementary note 12, wherein when an excessive force is applied between the holding member and a component included in the mechanism, the second elastic member alleviates the excessive force by deformation of the second elastic member.

(Supplementary Note 14)

The cleaning enabling device according to supplementary note 12 or 13, wherein the second elastic member is a second spring.

(Supplementary Note 15)

The cleaning enabling device according to any one of supplementary notes 1 to 14, further including the cleaning member.

(Supplementary Note 16)

The cleaning enabling device according to supplementary note 15, wherein the cleaning member has a brush shape.

(Supplementary Note 17)

A cleaning device including: the cleaning enabling device according to any one of supplementary notes 1 to 16; and a cleaning mechanism that performs the cleaning.

(Supplementary Note 18)

The cleaning device according to supplementary note 17, wherein the cleaning mechanism moves the magnetic head while keeping the cleaning member at the cleaning position in contact with the magnetic head at a time of the cleaning.

(Supplementary Note 19)

A magnetic tape device including the cleaning device according to supplementary note 17 or 18.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-025180, filed on Feb. 15, 2019, the disclosure of which is incorporated herein in its entirety by reference.

REFERENCE SIGNS LIST

1 Magnetic head
2 Cleaning member
3 Holder
3x Holding member
4 Arm unit
5 Base
6 Cam plate
7 Cam gear
8 Latch unit
9 Magnetic tape device
10 Magnetic tape
51 Cam gear shaft
61 Guide groove
71 Threading arm
72 OD spring on the threading side
73 OD spring on the unthreading side
74 Threading stopper
75 Latch gear pressing unit
91, 92 Reel
93 Loading unit
94 Threading unit
95 Magnetic head unit
96 Cleaning enabling unit
96x Cleaning enabling device
97 Cartridge
401 Latch gear
402 Swing gear
404 Guide arm
404a Leading end portion
404b Root portion
405 Buffer spring
405a, 405b, 921, 922 End portion
406 Latch spring
407 Joint shaft
408 Guide shaft
410 Cam gear pressing unit
415, 416, 417 Screw
421, 422 Tooth
432 Vertical bending portion
701 Angle
801 Latch lever
802 Latch pin
803 Shaft
811, 812 Surface
851x Transmission unit
856x First force application unit
901 Hole
911, 931, 932, 933, 934, 935, 936, 937, 938 Position

What is claimed is:

1. A cleaning enabling device comprising:
a holding member including a first surface capable of holding a cleaning member for cleaning a magnetic head, and a second surface capable of lifting a magnetic tape from the magnetic head when the cleaning member is at a cleaning position at which the cleaning can be performed, the holding member being movable between the cleaning position and a retraction position;
a transmission unit that transmits a first driving force for driving a first driving member included in a mechanism for performing threading of the magnetic tape and that also transmits a second driving force for the movement to the retraction position;

a first force application unit that applies, to the holding member, a first biasing force in a direction that causes the cleaning member to remain in the retraction position when the cleaning member is at the retraction position, and releases the first biasing force when the cleaning member is drawn away from the retraction positions;

a first arm being rotatably connected to a first shaft at a first position, and being rotatably connected to a third position of a second arm at a second position; and a second arm including the cleaning member at a fourth position, wherein the first driving member is a first rotational member being rotatable around a second shaft, the first driving force is a first rotational force for rotating the first rotational member around the second shaft, and the second driving force is a second rotational force for driving the first arm around the first shaft.

2. The cleaning enabling device according to claim 1, further comprising a path defining unit that determines a path of the movement.

3. The cleaning enabling device according to claim 1, wherein the transmission unit includes:

a first gear being rotatable around a third shaft; and a second gear being in mesh with the first gear and being rotatable around the first shaft, the first gear transmits the second rotational force to the second gear, as a third rotational force around the first shaft, and the second gear transmits the third rotational force to the first arm, as the second rotational force.

4. The cleaning enabling device according to claim 3, wherein the first force application unit includes a combination of a rotational member being rotatable around a fourth shaft and having a vicinity of a fifth position in contact with a predetermined rotational surface of the first gear, and a first elastic member, and the rotational member generates the first biasing force by a first elastic force of the first elastic member.

5. The cleaning enabling device according to claim 4, wherein the rotational member has a lever shape.

6. The cleaning enabling device according to claim 4, wherein the first elastic member is a first spring.

7. The cleaning enabling device according to claim 4, wherein the rotational surface includes a first rotational lateral surface in which an angle with respect to a radial direction of rotation of the first gear around the fourth shaft is a first angle, and a second rotational lateral surface in which the angle is a second angle smaller than the first angle, and, when a vicinity of the fifth position is in contact with the second rotational lateral surface, the first biasing force is applied to the holding member, and when a vicinity of the fifth position is in contact with the first rotational lateral surface, the first biasing force is released.

8. The cleaning enabling device according to claim 1, further comprising a second elastic member that transmits the first driving force between the first driving member and the holding member, as the second driving force.

9. The cleaning enabling device according to claim 8, wherein, when an excessive force is applied between the holding member and a component included in the mechanism, the second elastic member alleviates the excessive force by deformation of the second elastic member.

10. The cleaning enabling device according to claim 8, wherein the second elastic member is a second spring.

11. The cleaning enabling device according to claim 3, further comprising a second elastic member that transmits the third rotational force between the second gear and the first arm, as the second rotational force.

12. The cleaning enabling device according to claim 11, wherein, when an excessive force is applied between the holding member and a component included in the mechanism, the second elastic member alleviates the excessive force by deformation of the second elastic member.

13. The cleaning enabling device according to claim 11, wherein the second elastic member is a second spring.

14. The cleaning enabling device according to claim 1, further comprising the cleaning member.

15. The cleaning enabling device according to claim 14, wherein the cleaning member has a brush shape.

16. A cleaning device comprising: the cleaning enabling device according to claim 1; and a cleaning mechanism that performs the cleaning.

17. The cleaning device according to claim 16, wherein the cleaning mechanism moves the magnetic head while keeping the cleaning member at the cleaning position in contact with the magnetic head at a time of the cleaning.

18. A magnetic tape device comprising the cleaning device according to claim 16.

* * * * *